United States Patent
Weber

(10) Patent No.: US 9,304,901 B2
(45) Date of Patent: Apr. 5, 2016

(54) SYSTEM AND METHOD FOR HANDLING I/O WRITE REQUESTS

(71) Applicant: DataDirect Networks, Inc., Chatsworth, CA (US)

(72) Inventor: Bret S Weber, Wichita, KS (US)

(73) Assignee: DATADIRECT NETWORKS INC., Chatsworth, CA (US)

( * ) Notice: Subject to any disclaimer, the term of this patent is extended or adjusted under 35 U.S.C. 154(b) by 291 days.

(21) Appl. No.: 13/804,116

(22) Filed: Mar. 14, 2013

(65) Prior Publication Data

US 2014/0281123 A1    Sep. 18, 2014

(51) Int. Cl.
  *G06F 12/02* (2006.01)
  *G06F 12/08* (2006.01)
  *G06F 11/16* (2006.01)

(52) U.S. Cl.
  CPC ............ *G06F 12/0246* (2013.01); *G06F 11/16* (2013.01); *G06F 12/0868* (2013.01); *G06F 2212/286* (2013.01)

(58) Field of Classification Search
  CPC  G06F 11/16; G06F 12/0868; G06F 2212/286
  See application file for complete search history.

(56) References Cited

U.S. PATENT DOCUMENTS

| | | | |
|---|---|---|---|
| 5,761,705 A | 6/1998 | DeKoning et al. | |
| 6,917,990 B2 | 7/2005 | Henry et al. | |
| 6,944,712 B2 | 9/2005 | Weber et al. | |
| 7,043,622 B2 | 5/2006 | Henry et al. | |
| 7,818,461 B2 | 10/2010 | Weber | |
| 8,006,128 B2 | 8/2011 | Olster | |
| 8,086,794 B2 | 12/2011 | Fellinger et al. | |
| 8,250,401 B2 | 8/2012 | Olster | |
| 8,838,903 B2 * | 9/2014 | Caulkins | 711/133 |
| 2004/0103247 A1 * | 5/2004 | Bita et al. | 711/114 |
| 2005/0063216 A1 * | 3/2005 | Wilkins et al. | 365/154 |
| 2010/0293337 A1 * | 11/2010 | Murphy et al. | 711/136 |
| 2012/0102268 A1 * | 4/2012 | Smith et al. | 711/113 |
| 2013/0086324 A1 * | 4/2013 | Soundararajan et al. | 711/122 |

* cited by examiner

*Primary Examiner* — Charles Rones
*Assistant Examiner* — Tian-Pong Chang
(74) *Attorney, Agent, or Firm* — Marsh Fischmann & Breyfogle LLP

(57) ABSTRACT

System and methods for managing I/O write requests of host systems to physical storage. A storage subsystem includes a plurality of storage devices where each storage device is configured to provide data storage. At least a pair of redundant controllers is connected to the plurality of storage devices for executing the I/O write requests from the host systems. A received I/O write request is initially saved in a controller memory of one of the controllers and mirrored in controller memory of the other controller. In one embodiment, the I/O write request is transferred to a flash memory device for subsequent transfer to the storage devices. Once transferred to the flash memory device, the I/O write request may be flushed from the controller memories. The I/O write request may then be transferred to the storage devices from the flash memory device as a background operation.

9 Claims, 8 Drawing Sheets

SYSTEM AND METHOD FOR HANDLING I/O WRITE REQUESTS

FIELD

The presented inventions are generally directed to handling Input/Output (I/O) requests of host systems at physical storage subsystems. More specifically, the presented inventions relate to utilization of one or more solid state drives to improve I/O operations of write requests and particularly small block write requests in a physical storage subsystem.

BACKGROUND

Large storage systems typically include storage elements that include multiple individual storage devices (e.g., disk drives). The individual storage devices are accessed by host systems via Input/Output (I/O) requests, such as reading and writing, through one or more storage controllers. A user accessing the storage devices through the host system views the multiple storage devices as one or more volumes. Examples of large storage systems include, without limitation, Redundant Array Of Independent Disks (RAID) storage systems that have one or more logical units (LUNs) distributed over a plurality of disks, and spanned volumes (e.g., non-RAID architecture; JBOD, etc.). Examples of the host systems include computing environments, ranging from individual personal computers and workstations to large networked enterprises encompassing numerous types of computing systems. A variety of well-known operating systems may be employed in such computing environments depending upon the needs of particular users and enterprises. Storage devices in such large storage systems may include standard hard disk drives as well as other types of storage devices such as solid-state drives (SSD), optical storage, semiconductor storage (e.g., Random Access Memory disks or RAM disks), tape storage, et cetera.

In many large storage applications, enhanced reliability and data recovery of stored data is of heightened importance. Such reliability and data recovery is often provided through the use of multiple storage elements configured in geometries that permit redundancy of stored data to ensure data integrity in case of various failures. In many such storage systems, recovery from some common failures can be automated within the storage system itself by using data redundancy, error codes, and so-called "hot spares" (extra storage devices which may be activated to replace a failed, previously active storage device). To further improve reliability, it is known in the art to provide redundant storage controllers to reduce the failure rate of the storage system due to, for example, control electronics failures.

In any large storage system, a limiting feature in processing I/O requests is latency in accessing individual storage devices. It will be appreciated that access speeds of many electronic storage components, such as DRAM and solid state memory devices, continue to increase, often exponentially. The same has not tended to hold true for mechanical storage components, such as those found in rotating storage devices. For instance, seek latency of a rotating hard drive is limited by actuator arm speed and disk circumference, and throughput of such a rotating hard drive is limited by the rotational speed of the disk. As rotating storage devices continue to be among the most economical storage solution for mass storage systems, the physical limitations of these devices limit the Input/Output Operations Per Second (IOs per Second) for such systems. Such limitations can result in a write cache of a storage controller saturating in I/O intense applications as the write requests cannot be committed to connected storage devices (e.g., rotating storage media) as quickly as they are received.

SUMMARY

The presented inventions solve the above as well as other problems and advance the state of the useful arts by providing systems, apparatuses and methods (i.e., utilities) for handling I/O write requests from a host system to a storage system. More specifically, the utilities allow for the rapid de-allocation (e.g., flushing) of I/O write requests from controller memories (e.g., write caches). This is accomplished by utilization of one or more flash memory devices that temporarily store I/O write requests and allow for transferring of the I/O write requests to storage devices connected to the storage controllers after the I/O write requests are flushed from the controller memories.

In one aspect, an I/O write request is received requesting access to physical storage space, such as a block of storage space within a storage volume or logical unit, which is typically formed of a plurality of storage devices. At least a pair of redundant controllers are operatively interconnected to the storage devices. The I/O write request is initially allocated to memory in a first of the redundant controllers. The I/O write request is also mirrored to the memory of the second redundant controller. The I/O write request is then transferred to a flash memory device, such as a solid-state drive, for temporary storage prior to transferring to the storage devices. The flash memory may include a read cache and a mirror cache. Once transferred to the flash memory device, the I/O write request is de-allocated from the memories of the redundant controllers. That is, the I/O write request is flushed from the memories of the controllers. Accordingly, the memories of the controllers are available for processing additional I/O requests from host systems. This allows the storage controllers to maintain high IOs per Second capacity.

In one arrangement, the I/O write request, which is transferred to the flash memory device, is subsequently transferred to the storage devices as a background operation. That is, during idle, one of the redundant controllers buffers the I/O write request and transfers it to the storage devices. At this time, the I/O write request may be flushed from the flash memory device. In one arrangement, the flash memory device stores the I/O write request in both the read cache and the mirror cache. In this arrangement, the I/O write request may be flushed from the mirror cache after transfer to the storage devices and maintained in the read cache for subsequent access.

In a further arrangement, first and second flash memory devices are utilized to temporarily store I/O write requests. In such an arrangement, each controller may temporarily store I/O write requests to one or both of the flash memory devices (e.g., simultaneously). In one arrangement, each flash memory device may include a read cache and a mirror cache. The mirror cache of a first flash memory device may mirror the unexecuted I/O write requests in the read cache of the second flash memory device. Likewise, the mirror cache of the second flash memory device may mirror the unexecuted I/O write requests in the read cache of the first flash memory device. As will be appreciated, use of each flash device to mirror the unexecuted I/O write requests in the read cache of the other flash device also increases the utilization of each flash device while providing failover protection.

In another arrangement, the controller may determine a current memory utilization of the controller to determine whether temporary storage within the flash memory device will be utilized. That is, if the memory utilization of the controller is below a predetermined threshold level, temporary storage to the flash memory device may not be necessary to maintain desired IPOS levels and may be omitted. In such an arrangement, the I/O write request may be written directly to the storage devices. However, in this arrangement the I/O write request may still be written to the read cache of the flash device for subsequent access.

In one aspect, the utilities are implemented as methods performed by a storage subsystem. In another aspect, the utilities are implemented as a physical storage subsystem. In a further aspect, the utilities are implemented as instructions stored on a storage medium.

DETAILED DESCRIPTION

Figure 1:
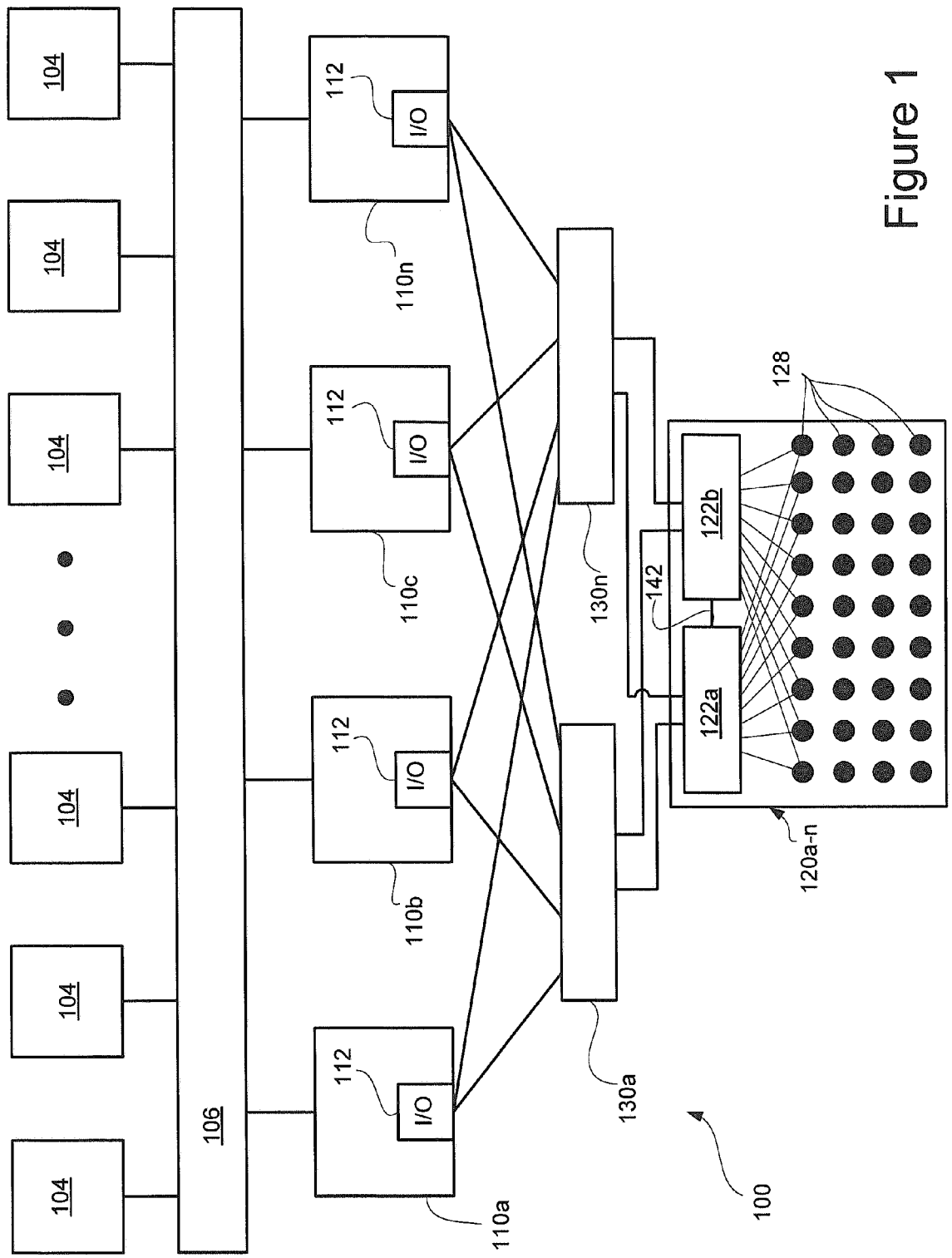
FIG. 1 is a block diagram illustrating a network implementing the storage subsystem in accordance with various aspects of the invention.

While the invention is susceptible to various modifications and alternative forms, a specific embodiment thereof has been shown, by way of example, in the drawings and will herein be described in detail. Those skilled in the art will appreciate that the features described below can be combined in various ways to form multiple variations of the invention. As a result, the invention is not limited to the specific examples described below, but only by the claims and their equivalents.

Provided herein is a storage subsystem that reduces or eliminates cache saturation in I/O write intensive applications, which can result in slowed TOPS for the storage subsystem. As discussed below, the storage subsystem is operative to rapidly flush I/O write requests from a main memory (e.g., DRAM) write cache after transferring the I/O write requests to an intermediate flash memory device. When processing capacity is available, the I/O write requests are subsequently transferred from the intermediate flash memory device to one or more storage devices.

With reference now to the figures and in particular with reference to FIG. 1, an exemplary embodiment of a storage subsystem 120, in accordance with aspects of the presented inventions, is provided. As shown, a computing network 100 includes multiple servers/host systems 110a-n connected to multiple storage subsystems 120a-n (only one shown for clarity) via multiple switches 130a-n (hereafter 110, 120 and 130, respectively, unless specifically identified), where the switches collectively define a switching fabric. The host systems 110 are typically interconnected to a plurality of computing devices 104 via a high speed network 106. Such high speed networks may include, for example, the internet, a local area network (LAN), a wide area network (WAN), or any other suitable network communications channel. These devices can be any of a variety of computing devices including, for example, laptops, desktops, workstations, handheld/wireless computing devices, or other computing devices. Data migration between the storage subsystems 120 and the computing devices 104 is managed by the host systems 110. Details of the connections between the computing devices 104 and host systems 120 are known to those skilled in the art.

The storage subsystems 120 are configured for handling I/O requests from the host systems 110, which communicate with the computing devices 104. The host systems 110 may be communicatively connected to the storage subsystems 120 for processing I/O requests through a variety of connections. Examples of such connections include Fibre Channel (FC), Small Computer System Interface (SCSI), Internet SCSI (ISCSI), Ethernet, Infiniband, SCSI over Infiniband, piping, and/or various physical connections. A variety of well-known operating systems may be employed in such computing environments depending upon the needs of particular users and enterprises.

I/O modules 112 process I/O requests from the host systems 110 in order to access physical storage space within the storage subsystems 120. The I/O modules 112 have host connect interfaces for receiving I/O requests from the host systems and transferring data between the host systems 110 and the storage subsystems 120. The I/O modules 112 can connect to the host systems through a variety of means. Each I/O module is communicatively connected to the switching fabric through multiple communications switches, such as Application Specific Integrated Circuits (ASIC), configured to route data from a host system 110, through the switching fabric, and on to storage elements or devices of a storage subsystem according to a specific address. Those skilled in the art are familiar with communications switches and will readily recognize the design of such switches (e.g., custom ASICs) for purposes of transferring messages through such a switched fabric or other communication medium.

In the present embodiment, the I/O requests are transferred from the I/O modules 112 to storage devices of the storage subsystems 120 through the switches 130 of the switching fabric. Each of the storage subsystems 120 typically includes a plurality of individual storage devices 128, such as rotating media/disks and/or other types of storage devices (e.g., solid state drives, optical storage, tape storage, semiconductor storage) that may be arranged into one or more logical units (LUNs) and controlled by redundant controllers 122a, 122b. Typically, the redundant controllers are formed of a pair of redundant controllers, though other configurations are possible. The storage devices and storage controllers can be configured to employ any of a number of storage management schemes, such as that of a RAID storage management system (e.g., Raid 0, 6 etc.). In such an arrangement, the storage controllers may include RAID storage controllers for processing the requests of host systems 110 through I/O modules 112 and communication switches 130. However, the presented embodiments are not limited to only RAID configurations.

In the illustrated embodiment, the storage devices 128 can appear as a single virtual storage system to the host systems. In operation, the I/O requests includes a Command Data Block (CDB) that contains information (e.g., Logical Unit Identifier (LUN) and offset or Logical Block Address (LBA)) regarding the location of data in terms of the virtual storage system. This information is translated into a new I/O request relating to the physical location in the appropriate storage subsystem. Thus, mapping tables may be implemented for translating virtual storage locations of the virtual storage system into physical storage locations of the storage subsystems (i.e., storage locations of the individual storage devices). Data may then be written or retrieved from the storage devices by the controllers of the appropriate storage subsystem.

In the present embodiment, each of the storage subsystems 120 includes a pair of storage controllers 122a, 122b (i.e. redundant controllers) for processing I/O requests, such as read and write requests from the host systems 110. Each of the controllers is operatively connectable with each of the individual storage devices 128 to affect such read/write requests (all connections are not shown for purposes of clarity). The illustrated embodiment also utilizes redundant connections between each host system 110, switch 130, and storage subsystem 120. For example, a first host system 120a is interconnected to two fabric switches 130a, 130b, which are, in turn, each connected to each controller 122a, 122b of a storage subsystem 120a. In this regard, dual path architecture is utilized to provide redundant paths between the host system 110a and the storage subsystem 120a. One of the features of such architecture is capability of failover; meaning that in case one path fails or a fabric switch 130a fails, data can be sent via the second fabric switch 130b. The number of host systems 110, storage subsystems 120, fabric switches 130 and I/O modules 112 forming the network 100 is not intended to be limited to the number of host systems 110, storage subsystems 120, fabric switches 130, and/or I/O modules 112 in the present embodiment.

Like the use of redundant connections, the use of the redundant storage controllers 122a, 122b in each of the storage subsystems 120 can reduce the failure rate of the storage subsystem due to control electronics failures. In this arrangement, the redundant pair of controllers 122a, 122b control the same storage devices 128 (e.g., array of storage devices 126). See FIG. 2. A memory 124a, 124b is operatively connected with each of the controllers 122a, 122b and the redundant controllers communicate with one another to ensure that the memories 124a, 124b are synchronized. In this regard, I/O requests are mirrored in the memory of each controller. That is, if a first controller 122a receives an I/O request, this I/O request is stored in allocated memory blocks in the memory 124a of the first controller and mirrored (e.g., copied) to allocated memory blocks in the memory 124b of the second controller, for example, via an Inter-controller Channel 142 (ICL) physically interconnecting the controllers 122a, 122b. This is illustrated by dashed arrow 'A' in FIG. 2. In such an arrangement, if the first controller experiences a failure, the second controller may continue processing the I/O request while the first controller is repaired or replaced. Though illustrated to show the first controller 122a handling the I/O request, it will be appreciated that the second controller 122b likewise handles I/O requests (e.g., simultaneously with the first controller 122a). That is, each controller 122a, 122b is typically assigned and handles I/O requests for a portion of the storage devices 128, which may be configured into various logical units (LUNs). More specifically, each controller typically handles the I/O requests for its assigned LUNs. Accordingly, all discussion herein to handling of I/O requests by the first controller 122a is likewise applicable to handling of I/O requests by the second controller 122b.

The storage subsystem 120 may also incorporate a read cache 150 for storing frequently accessed data from the storage devices 128 and/or for storing recently written I/O write requests, such that this information is available from the read cache for future read requests. In this regard, the read cache 150 may be a flash memory device that may be pre-loaded (e.g., pre-warmed) with frequently accessed data from the storage devices 128. When the cache 150 fills, it may be flushed utilizing least recently used (LRU) or similar staleness algorithms as known to those skilled in the art.

Figure 3:
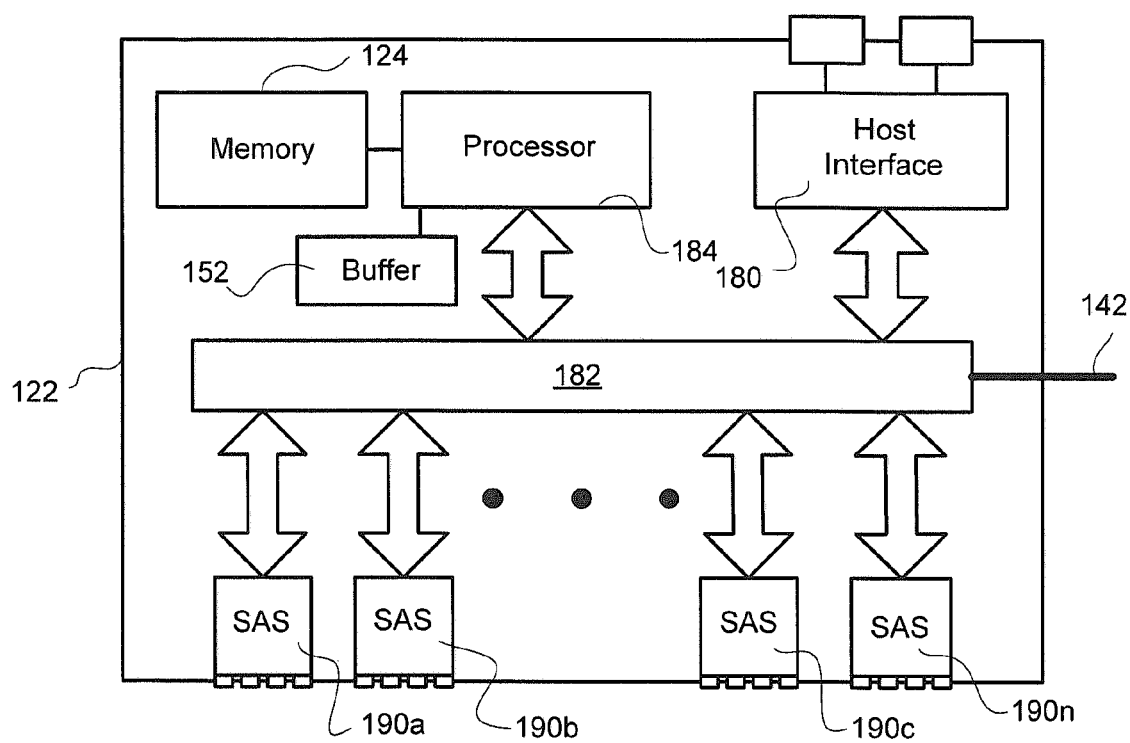
FIG. 3 is a block diagram illustrating an exemplary embodiment of a controller utilized in a storage subsystem.

FIG. 3 illustrates an exemplary embodiment of one of the controllers 122a, 122b, hereafter referred to as "controller" 122. It will be appreciated that architecture of the other controller can be identical. In the one embodiment, the controller is primarily formed of embedded firmware. However, it will be appreciated that other embodiments may comprise software and/or hardware implementations. As shown, the controller 122 includes a multi-ported host interface 180 or front-end interface that is capable of communicating with a host system, such as the host system 110 of FIG. 1, through a variety of means, including, without limitation, FC, SCSI, SCSI ISCSI, SAS, PCIe, Ethernet, Infiniband, SCSI over Infiniband, piping, and/or various physical connections. The host interface 180 may comprise one or more individual circuits or chips (e.g., ASICs). In any arrangement, the host interface 180 receives an I/O request from the host system to access a block of storage space within a storage device. The host interface 180 transfers that I/O request to the memory 124 of the controller 122 via a bus 182. In one embodiment, such transfer may comprise a Direct Memory Access (DMA) transfer such that the I/O request is stored to allocated memory blocks within the memory 124 independent of operation of the processor 184 of the controller 122. The I/O request is likewise provided to the ICL 142 such that it may be copied in allocated memory blocks in the memory of the other controller. As shown, the controller 122 also includes a buffer 152 that allows for transferring data between an SSD or other flash device and the storage devices (see, e.g., FIG. 4), as is more fully discussed below. Though shown as a separate component, it will be appreciated that the buffer may be an allocated portion of the memory 124 of the controller.

Figure 2:
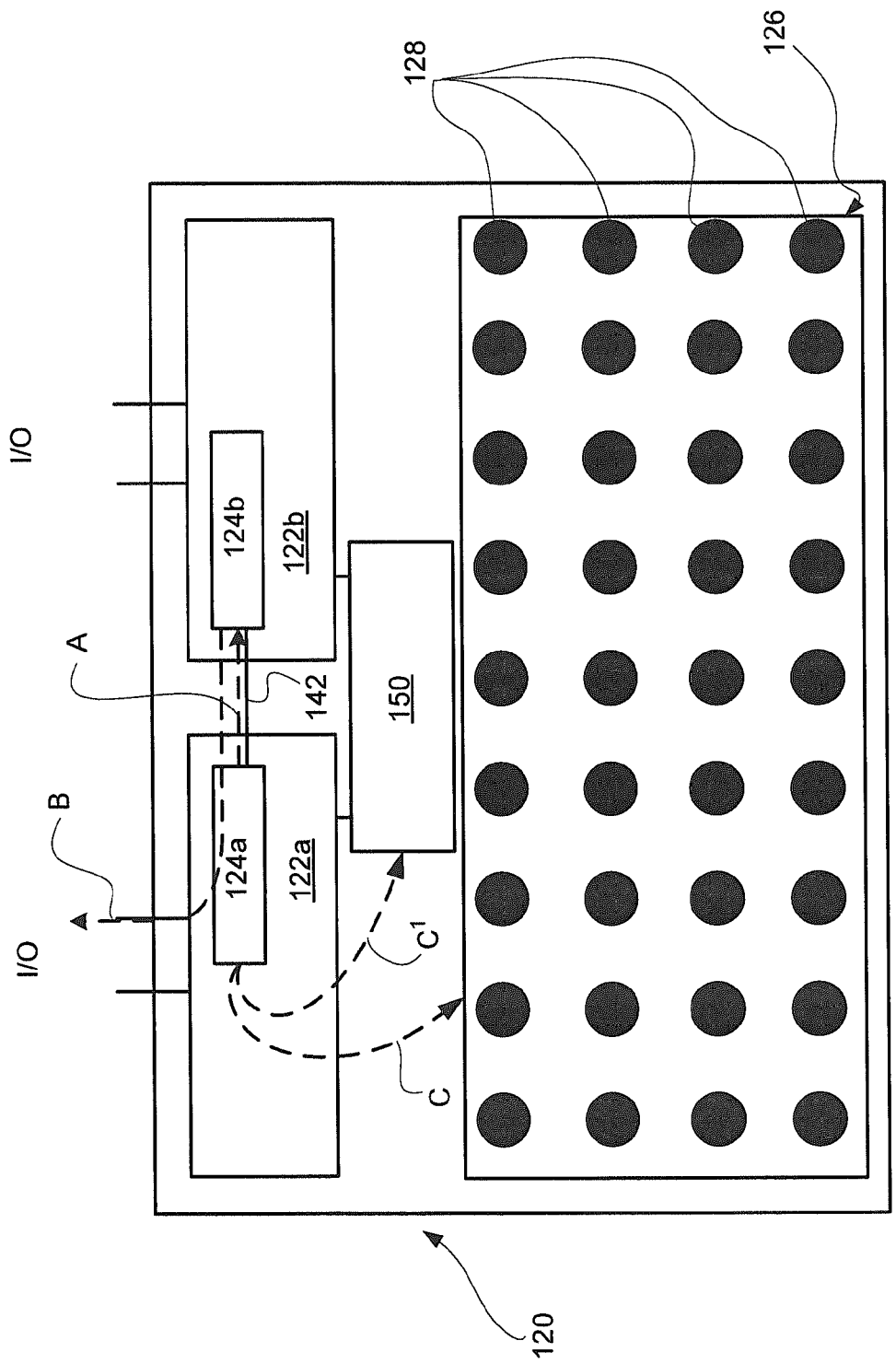
FIG. 2 is a block diagram illustrating one embodiment of a storage subsystem.

Once the I/O request is stored in memory 124, the processor 184 accesses the I/O request, in the case of read request, and determines if the requested data exists within the read cache (see for example FIG. 2). If so, the data is retrieved from the read cache and output to the requesting host system via the host interface 180. If not, the processor 184 accesses the storage devices through the back end interface, which, in the present embodiment, is a plurality of Serial Attached SCSI (SAS) chips 190a-n. However, it will be appreciated that other back-end protocols/architectures such as, without limitation, SATA, SCSI, Ethernet, PCIe, and FC may be utilized in the back-end interface. When the I/O request is a write request, the write data is output to the storage devices and/or an SSD 160 via the back-end interface, typically through a DMA request. The ports of the SAS chips 190a-n are interconnected to one or more arrays 126 of storage devices 128 via SAS connectors (not shown). Each array may include appropriate I/O modules (e.g., SAS expanders, etc) as known to those skilled in the art. Additionally, one or more solid state drive (SSD) read and/or write caches may be connected to ports of the SAS chips 190a-n, as more fully discussed below.

A limiting feature in processing I/O requests by the controllers 122 is the latency in accessing the storage devices 128. This can be more apparent when the I/O request includes multiple write requests that require data to be stored to relatively slow (e.g., in comparison with the controller memory) rotating media, as illustrated in FIG. 2. To improve performance of the storage subsystem, a write-back cache is utilized by the storage controllers. In this arrangement, when one storage controller (e.g., controller 122a) receives a request to write data to the storage devices 128, this data is stored in a write cache in the memory 124a (e.g., DRAM) of that controller 122a and mirrored in the write cache of the memory 124b of the second controller 122b, as illustrated by dashed arrow A. At this time, a command-complete signal can be returned to the requesting host indicating that the write operation is complete, as illustrated by dashed arrow B. Some embodiments send this command complete signal before the data is actually written to the storage devices 128, as a back-up copy exists in the memory 124b of the second controller 122b.

In the absence of a failure of the receiving controller 122a, the receiving controller 122a writes the data to the storage devices 128, as illustrated by dashed arrow C. Once written to the storage devices 128, a write complete signal is generated and the memory blocks of the two memories 124a, 124b of the two controllers 122a, and 122b may be de-allocated, freeing these memory blocks for storage of subsequent I/O requests. If the receiving controller 122a were to fail prior completing the write request, the second controller 122b would complete the write. As illustrated in FIG. 2, in addition to writing the data to the storage devices, the data may be mirrored (e.g., simultaneously) to the read cache 150, as illustrated by dashed arrow C'. As shown, the read cache 150 is operatively connected to both controllers 122a, 122b and may be in the form of a flash memory device, such as a solid state drive or PCI device.

Notwithstanding the use of write-back caching of I/O requests, in I/O intensive applications (e.g., small-block write applications), the storage controller memory 124 often receives I/O write requests faster than the requests can be processed. In such instances, the write cache of the controller memory 124 can become overwhelmed while waiting on the relatively slow flush to the storage devices 128. That is, pending I/O requests (i.e., the I/O stack) may fill the write cache. Performance of the storage subsystem 120 slows after the write cache fills. That is, new write requests from the I/O modules 112 are delayed until blocks in the controller memories 124a, 124b are de-allocated and available to store new I/O requests.

Figure 4:
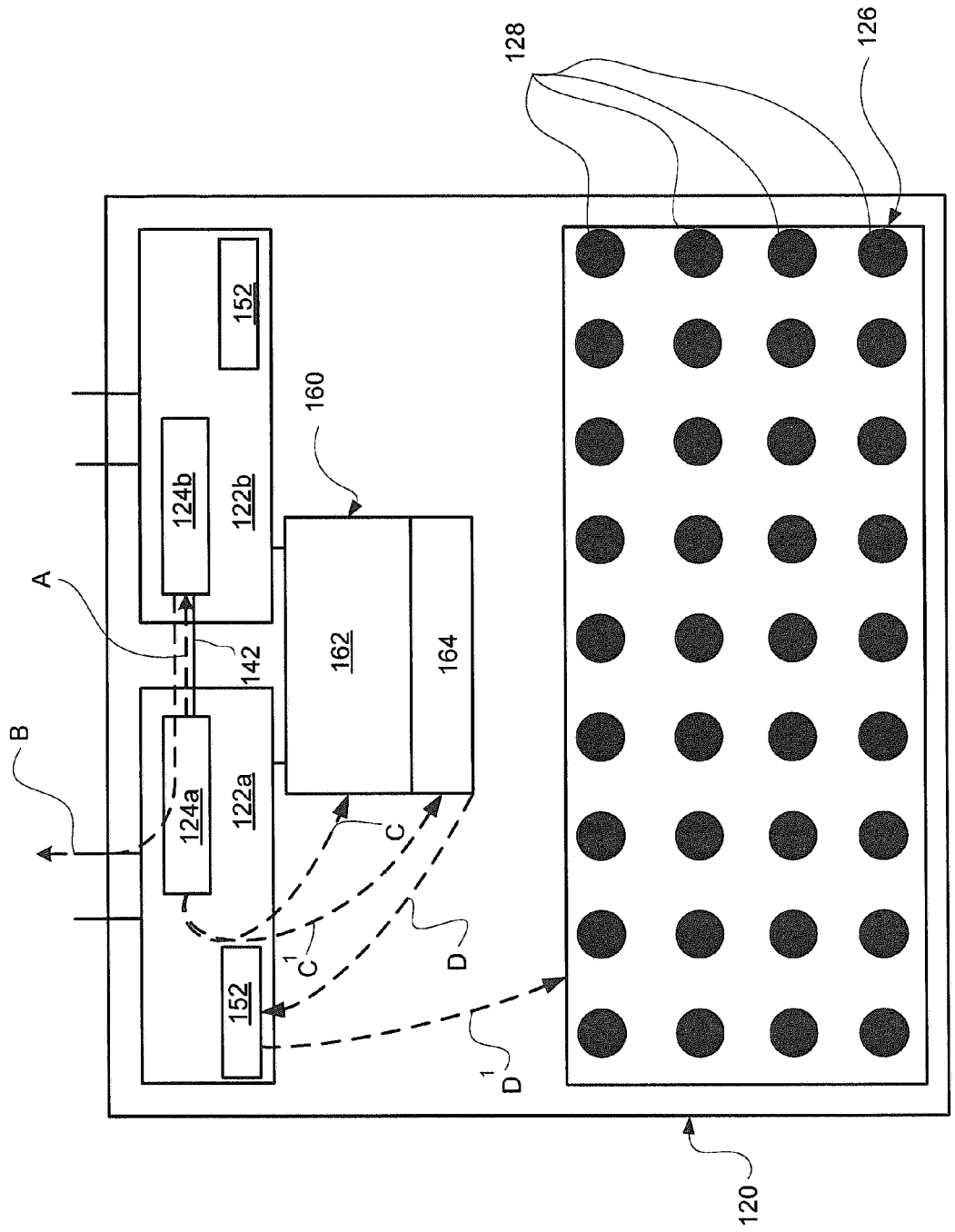
FIG. 4 is a block diagram illustrating another exemplary embodiment of a storage subsystem.

FIG. 4 illustrates the storage subsystem 120 utilizing redundant controllers 122a, 122b and further incorporating a solid-state drive (SSD) 160 that is operative to receive read and write operations originating from the controllers. As above, when one storage controller (e.g., controller 122a) receives a request to write data to the storage devices 128, this data is stored in a write cache in the memory 124a of that controller 122a and mirrored in the write cache of the memory 124b of the second controller 122b (illustrated by dashed arrow A) and a command complete signal is returned to the requesting host indicating that the write operation is complete (illustrated by dashed arrow B). However, in this embodiment, the receiving controller 122a schedules the write operation to the SSD 160 as illustrated by dashed arrow C. Once the data is mirrored (e.g., copied) to the SSD 160, a write-complete signal is generated and the memory blocks of the two memories 124a, 124b of the two controllers 122a, 122b are de-allocated, thus freeing these memory blocks for the storage of subsequent I/O requests. The data in the solid-state drive 160 may then be transferred to the storage devices 128, which may be completed as a background operation from the view of the controllers 122a, 122b. In this regard, one of the controllers 122a, 122b (i.e., typically the controller that received the I/O write request) may be utilized to buffer the data and transfer the data to the storage devices 128, as illustrated by dashed arrows D and $D^1$. This data may be buffered in allocated memory (e.g., DRAM) of the controller or may be buffered in a separate buffer 152. In either embodiment, transfer of the data may occur during processor idle to preserve the IOs per second of the controller.

If the write request data were written to a single SSD 160 in a single location, no redundancy would exist for the I/O write request data. In this regard, failure of the solid-state drive 160 would result in loss of the I/O write request data. In order to provide a redundancy for the I/O write request data, the SSD 160 may be partitioned into a read cache and a mirror cache to provide a redundant copy of the data. However, partitioning of a single SSD would still result in data loss if the single SSD fails. Accordingly, in a preferred embodiment, two separate SSDs are utilized for the read cache 162 and the mirror cache 164. In these embodiments, the receiving controller 122a simultaneously schedules the write operation to both the read cache 162 and the mirror cache 164, as illustrated by dashed arrows C and $C^1$. The mirror cache 164 acts as a mirror for the unexecuted I/O write request data within the read cache 162 thereby providing a redundant copy of the I/O write request data. Once the I/O write request data is written to the read cache 162 and the mirror cache 164, a command-complete signal is generated and the memory blocks of the two controller memories 124a, 124b may be de-allocated, quickly freeing these memories for additional write operations. After stored to the mirror cache 164, one of the controllers may buffer the data of the I/O write request from the mirror cache 164 and transfer that data to the storage devices 128 when processing capability is available. In one embodiment, a serial buffer is utilized to prevent over-allocation of controller memory resources for handling the transfer of data between the mirror cache 164 and the storage devices 128. As soon as those write requests are transferred to the storage devices 128, as illustrated by dashed arrows D and $D^1$, the I/O write request may be removed from the mirror cache 164 as the data is now stored to the storage devices 128, which may provide redundant copies thereof. That is the I/O write request may be flushed or marked as de-allocated and invalid so the location within the mirror cache can be reused. The mirror cache 164 may utilize contiguous storage areas, extents, and metadata to store the data in order to reduce fragmentation and to allow the controllers to determine where to transfer the data (e.g., storage device address) from the mirror cache. Further, this information permits the data block(s) associated with the data to be flushed from either controller once the data is transferred to the storage devices.

In the embodiment, where the single SSD 160 device is partitioned into two separate caches or utilizes two separate SSDs, the caches 162, 164 need not be the same size. That is, it may be desirable that the read cache 162 be considerably larger than the mirror cache 164. In this regard, the read cache may maintain a copy of the current I/O write request, previously handled I/O write requests, and/or be pre-warmed with frequently accessed data from the data storage devices 128. As will be appreciated, the access time (e.g., latency) for retrieving data from the read cache 162, which is a solid state device utilizing integrated circuit assemblies as memory, is considerably lower than the access time for accessing data from the storage devices that use rotating media. Accordingly, it is desirable that the read cache be operable to store large amounts of data. In contrast, the mirror cache 164 need only store I/O write requests until the data of the write requests are written to the storage devices 128. As soon as it is written to the storage devices 128, the mirror cache may be flushed to remove the I/O request as this data is stored to the storage devices 128. In this regard, the mirror cache 164 may be a fraction of the size of the read cache 162.

Figure 5:
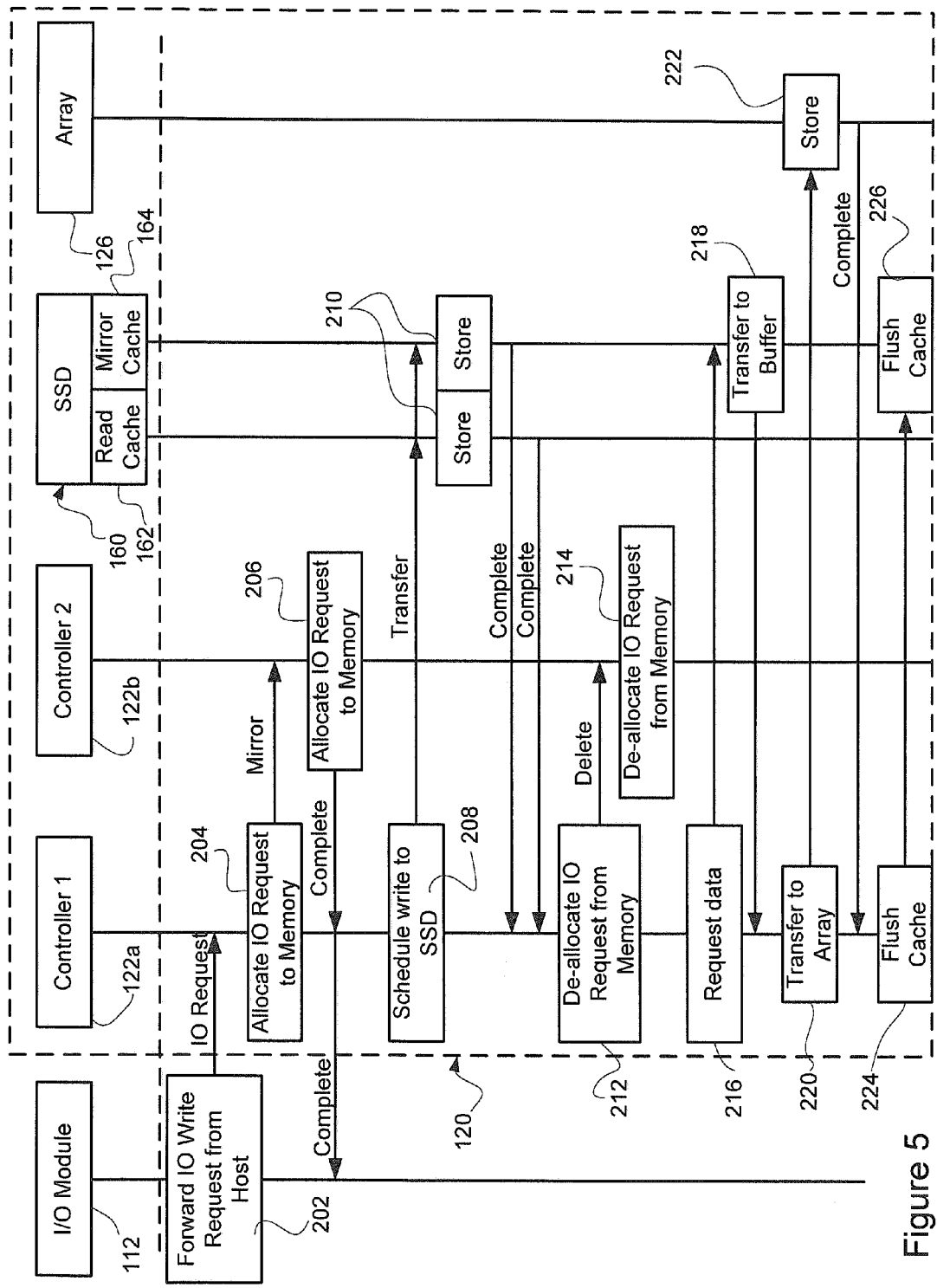
FIG. 5 is an operational diagram illustrating an exemplary operation of FIG. 4.

FIG. 5 shows an operational diagram illustrating the operation of the system of FIG. 4. Initially, a host system sends an I/O write request to an input-output module 112 requesting to write to one or more blocks within the array 126 of storage devices 128 in the storage subsystem 120. The I/O module 112 forwards the request to one of the controllers 122a within the storage subsystem in step 202. The first controller 122a receives the I/O write request and allocates that request to memory in step 204. The first controller 122a then sends the I/O request to the second controller 122b, which likewise allocates the I/O request to memory in step 206. Once allocated to memory in the second controller 122b, the second controller 122b generates a write-complete signal that is provided to the first controller 122a, which triggers the first controller to send a command-complete signal to the I/O module 112. At this time, the first controller 122a schedules a write to the read cache and mirror cache of the solid-state drive 160 in step 208. The read cache 162 and mirror cache 164 store the data received from the first controller 122a, in step 210. These caches 162, 164 provide command-complete signals to the first controller 122a once the data is stored. The first controller 122a then de-allocates the input-output request from memory in step 212. In conjunction with de-allocating its memory, the first controller 122a generates an output to the second controller 122b indicating that data is stored to the SSD caches. The second controller 122b likewise de-allocates the I/O request from memory in step 214. Subsequent to or in conjunction with the de-allocation of the controller memories, the controller 122a requests (e.g., during idle) the data of the I/O request from the mirror cache 164 in step 216 which is transferred to the controller 122a in step 218. The controller 122a transfers this data to the storage devices in the array 126 step 220, and the storage device stores the data in step 222. A write-complete signal is provided to the controller, which instructs the mirror cache to flush or otherwise de-allocate the I/O request in steps 224 and 226.

Though FIG. 5 discusses the first controller 122a handling the I/O request, it will be appreciated that the same process may be performed by the second controller 122b, and that the first and second controllers may handle I/O requests simultaneously. In such an arrangement, a portion of the read cache 162 and the mirror cache 164 may be allocated to each controller 122a, 122b.

Figure 6:
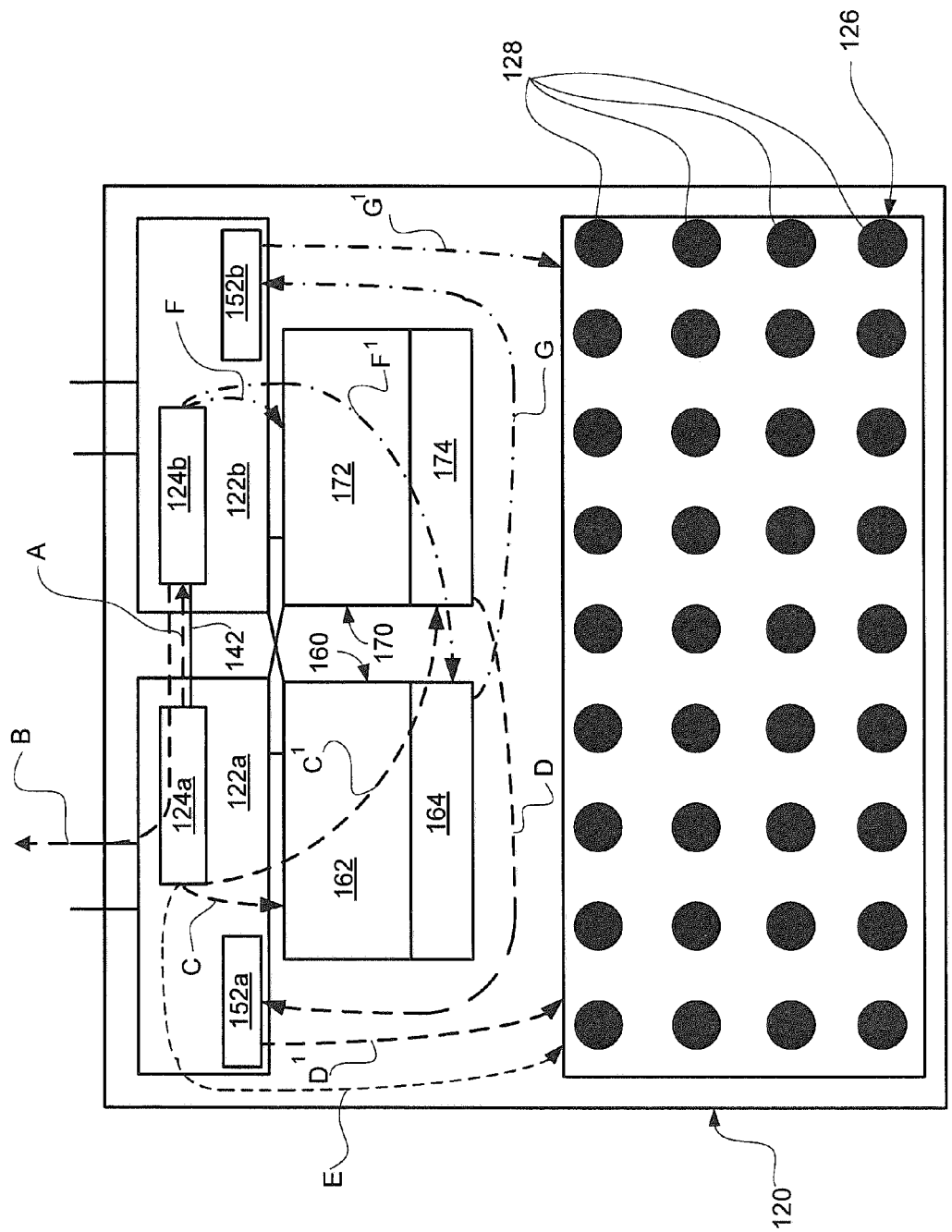
FIG. 6 is a block diagram illustrating another exemplary embodiment of a storage subsystem.

FIG. 6 illustrates a further embodiment of the storage subsystem 120. The system of FIG. 6 is similar to the system of FIG. 4 with the exception that two solid-state drives 160 and 170 are each partitioned into first and second caches, specifically read caches 162, 172, and mirror caches 164, 174. Alternatively, four or more separate SSDs may be utilized. The use of pairs of partitioned SSDs 160, 170 provides a further level of redundancy for the system and increases the utilization of each SSD. That is, each SSD is utilized for both read caching and mirroring the non-redundant data (e.g., unexecuted I/O write requests) of the read cache of the other SSD. That is, the mirror cache 164 of the first SSD 160 mirrors the non-redundant data on the read cache 172 of the second SSD 170. Likewise, the mirror cache 174 of the second SSD 170 mirrors the non-redundant data on read cache of the first SSD 160. The inclusion of two read caches 162 and 172 provides a further benefit for the storage subsystem 120. Specifically, the availability of two read caches doubles the bandwidth of the read cache and thereby provides increased throughput of cached data to satisfy read requests and doubles the total size of the read cache of the storage subsystem, allowing additional read caching.

In the embodiment of FIG. 6, after mirroring an I/O request to the second controller 122b (illustrated by dashed arrow A) and returning a command complete signal to the requesting host (illustrated by dashed arrow B), the controller 122a simultaneously schedules the write operation to the read cache 162 of the first SSD 160 and the mirror cache 174 of the second SSD 170, as illustrated by dashed arrows C and $C^1$. Once the I/O write request is written to the read cache 162 and mirror cache 174, command complete signals are generated and the memory blocks of the two controller memories 124a and 124b may be de-allocated. As computing resources become available, the data may be transferred from the mirror cache 174 via a buffer 152a associated with the controller 122a, as illustrated by dashed arrows D and $D^1$. Again, transfer of the data to the storage devices may be performed as a background operation during idle to preserve the IOs per second and memory resources of the storage subsystem 120. Likewise, the second controller 122b may simultaneously handle I/O write requests. When handled by the second controller 122b, a write request is initially mirrored to the memory of the first controller 122a and is transferred to the read cache 172 of the second SSD 170 and the mirror cache 164 of the first SSD 160, as illustrated by dot-dashed arrows F and Again, as resources become available, the data may be transferred from the mirror cache 164 via a buffer 152b associated with the second controller 122b, as illustrated by dot-dashed arrows G and $G^1$.

Figure 7:
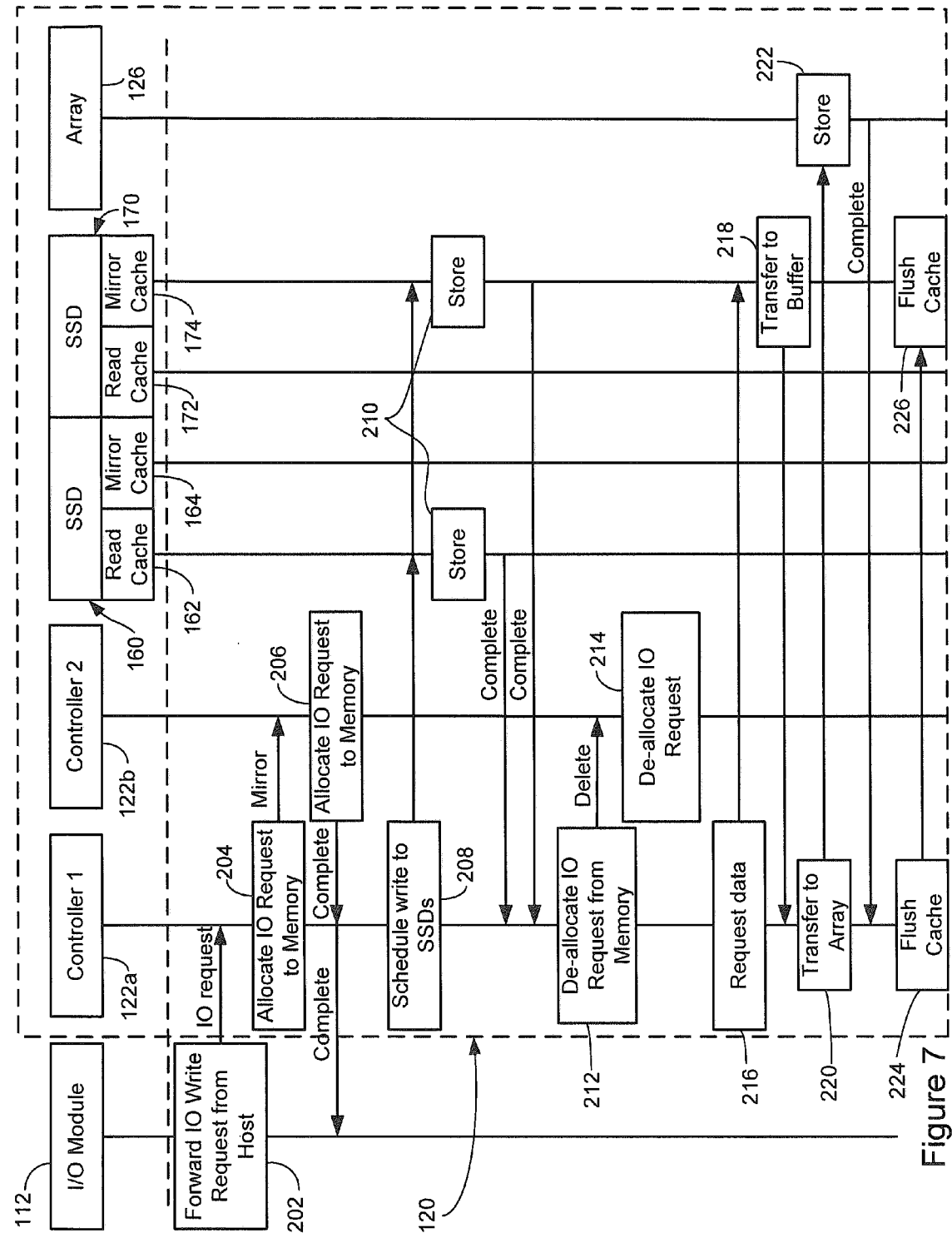
FIG. 7 is an operational diagram illustrating an exemplary operation of FIG. 6.

FIG. 7 shows an operational diagram illustrating the operation of the first controller 122a FIG. 6. The operation of the second controller is similar though not shown for purposes of clarity. As shown, the operational diagram is substantially similar to the operational diagram of FIG. 5, and the steps performed are identical with the following exceptions. In step 208, the first controller 122a schedules a write to the read cache 162 of the first solid-state drive 160 and the mirror cache 174 of the second solid-state drive 170. Likewise, in step 210, the read cache 162 and mirror cache 174 store the data received from the first controller 122a. In step 216 the first controller 122a requests the data from the second mirror cache 174, and in step 226 the second mirror cache is flushed or otherwise de-allocated.

In a further arrangement, each of the read caches 162, 172 and each of the mirror caches 164, 174 may be portioned such that a portion of all four caches are allocated to each controller. In such an arrangement, the controller may be operable to utilize all four of the caches for handling I/O write requests. That is, the controller may utilize a selected opposing pair of the read and mirror caches (e.g., 162, 174 or 172, 164) for temporary storage of the I/O write request. Alternatively, to provide a double redundancy, the controller may be operative to output the I/O write request to all four of the caches. In such an arrangement, the controller may utilize heuristic logic to retrieve the I/O write request from one of the mirror caches for transfer to the storage devices. Likewise, the controller is operative to flush both mirror caches after transfer to the storage devices is completed.

In either of the embodiments of FIGS. 4 and 6, it is possible to bypass the storage to the SSDs. For instance, if memory utilization of a controller is low (e.g., few write requests are pending), it may be preferable to write the I/O request directly to the storage devices 128. That is, during period of low I/O write request activity, intermediate storage to the SSDs may be omitted. This is illustrated in the process flow sheet of FIG. 8. As shown, the process 300 includes receiving 302 an I/O write request at a storage controller and allocating the write request to the main memory (e.g., write cache) of the controller. Once the write request is received and/or mirrored to a main memory of a redundant controller, a determination 304 is made regarding the cache utilization of the receiving controller. If the main memory utilization of the controller is below a predetermined threshold, the write request is written 306 directly to the storage devices. This is illustrated in FIG.

6 by dashed arrow 'E'. In addition, the write request may be written 308 (e.g., simultaneously) to the read cache of one or more flash devices. Once written to the storage devices, the controller de-allocates 310 the I/O write request from the main memory. In instances where the main memory cache utilization of the receiving controller is above the predetermined threshold, the write request may be moved to intermediate storage for subsequent transfer to the storage devices. That is, the I/O write request is written 312 or mirrored to the read and mirror caches of one or more flash devices. Once completed, the controller de-allocates 314 the I/O write request from the main memory. The data of the I/O write request is then transferred 316 to the storage devices from the flash device during idle. Once transferred to the storage devices, the mirror cache of the flash device is flushed 318. As will be appreciated, this process 300 allows for more effective utilization of the storage subsystem during periods of low I/O activity.

The storage subsystem can be implemented in a number of configurations. For example, in one embodiment, the storage subsystem 120 can be implemented in a 4U form factor chassis for an enterprise version. In one arrangement, the first and second controllers are implemented in separate 3U units that are co-located with a 1U uninterruptable power supply (UPS), which provide emergency power to their respective controller unit in the event that a main input power source is interrupted. The remainder of the chassis may house 4U arrays of storage devices, which in one embodiment, each comprise 60 or 84 storage devices. The SSDs may be housed within one of the units. In any arrangement, the necessary cabling (e.g., SAS connectors) extend between the controllers, SSDs, and storage devices.

Figure 8:
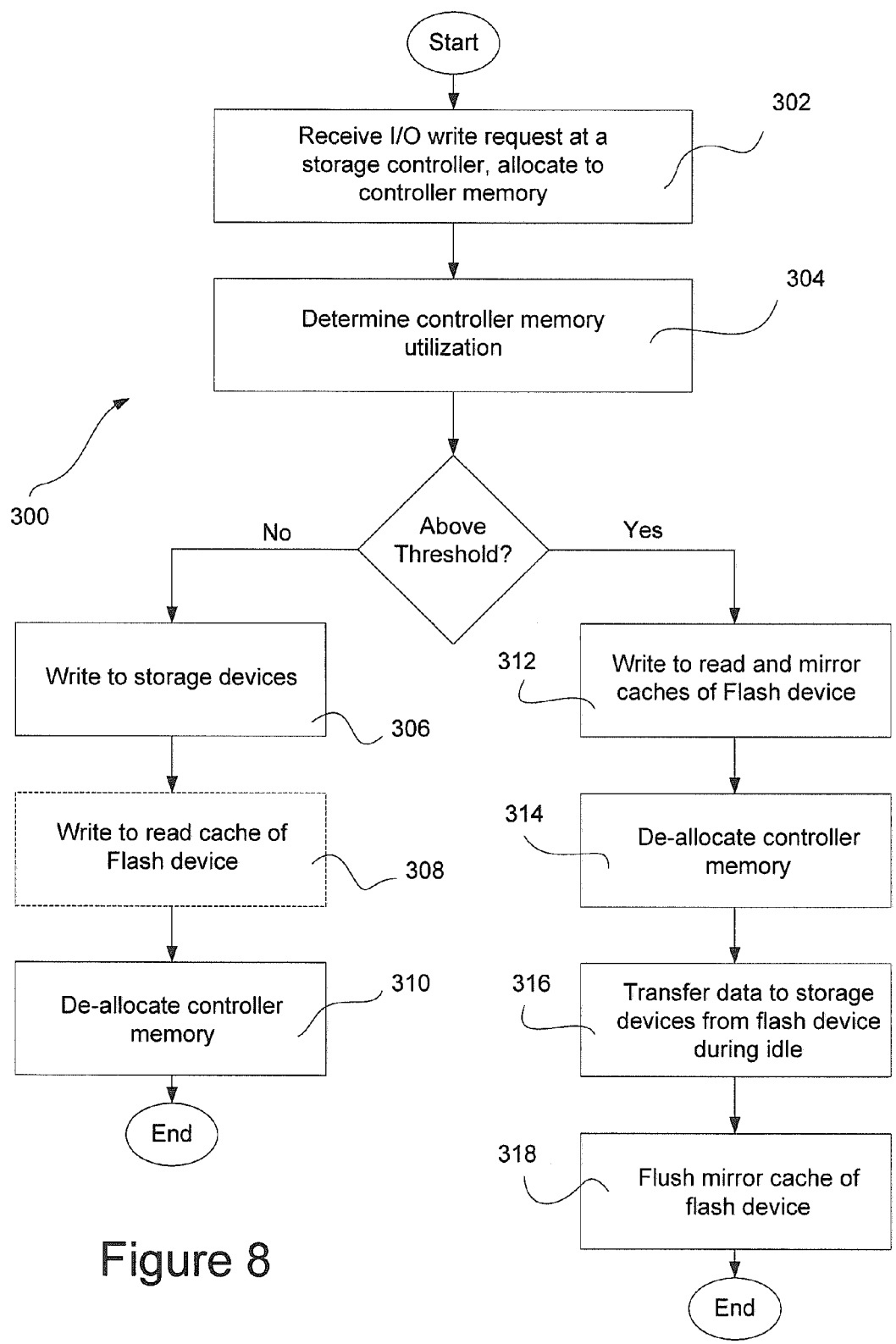
FIG. 8 is a process flow sheet illustrating an exemplary operation of FIG. 4 or FIG. 6.

Instructions that perform the operations of FIGS. 5, 7 and 8 can be stored on storage media. The instructions can be retrieved and executed by a microprocessor. Some examples of instructions are software, program code, and firmware. Some examples of storage media are memory devices, tapes, disks, integrated circuits, and servers. The instructions are operational when executed by the microprocessor to direct the microprocessor to operate in accord with the invention. Those skilled in the art are familiar with instructions and storage media.

While the preceding examples illustrate processing I/O requests from a host system, the examples are not intended to be limiting. Those skilled in the art understand that other combinations of processing I/O requests at a storage controller or pair of redundant storage controllers will fall within the scope of the invention. Those skilled in the art will also understand that other methods can be used to process requests that fall within the scope of the invention.

Features of the inventions include increasing the IOs per Second of a storage controller through the intermediate storage of I/O write requests to one or more SSDs, which allows for earlier de-allocation (e.g., flushing) of the controller memory. Other features include improved write request management of numerous small block write requests (e.g., 512-16 k bytes) though the storage subsystem of the presented invention is likewise beneficial for large block write requests.

While the inventions have been illustrated and described in the drawings and foregoing description, such illustration and description is to be considered as exemplary and not restrictive in character. Protection is desired for all changes and modifications that come within the spirit of the inventions. Those skilled in the art will appreciate variations of the above-described embodiments that fall within the scope of the inventions. As a result, the inventions are not limited to the specific examples and illustrations discussed above, but only by the following claims and their equivalents.

What is claimed:

1. A method of managing write requests of a host system to a plurality of storage subsystems, each storage subsystem comprising a plurality of storage devices configured as one of more logical units configured for providing data storage and each storage subsystem further comprising a pair of storage controllers coupled to the storage devices, the method including:
   receiving an I/O write request at a first storage controller of a storage subsystem, the I/O write request addressing a storage location for data within the storage devices of the storage subsystem;
   allocating the I/O write request to a first set of allocated storage blocks in a first cache memory of the first controller and a second set of allocated storage blocks in a second cache memory of a second controller;
   transferring the I/O write request to both a read cache and a mirror cache of a solid state drive (SSD), wherein the mirror cache mirrors unexecuted I/O write requests in the read cache of the SSD that address storage locations within the storage devices;
   subsequent to transferring the I/O write request to the SSD, de-allocating the first and second sets of allocated storage blocks in the first and second cache memories of the first and second controllers and subsequent to transferring the I/O write request data to the storage devices of the storage subsystem, flushing the I/O write request from the mirror cache while maintaining the I/O write request in the read cache for subsequent access.

2. The method of claim 1, further comprising:
   determining, at one of the controllers, a level of cache utilization of the cache memory of the controller; and
   upon determining the level of cache utilization being below a predetermined threshold, transferring the I/O write request to the storage devices directly from the controller.

3. The method of claim 1, further comprising:
   determining, at one of the controllers, a level of cache utilization of the cache memory of the controller; and
   upon determining the level of cache utilization being above a predetermined threshold, simultaneously transferring the I/O write request to both of the read cache and mirror cache of the SSD.

4. The method of claim 1, further comprising transferring the I/O write request from the mirror cache of the SSD to the storage devices.

5. The method during of claim 4, wherein the I/O write request is transferred during idle of one of the first and second controllers.

6. The method of claim 4, wherein the step of de-allocating occurs prior to the I/O write request being transferred to the storage devices from the mirror cache of the SSD.

7. The method of claim 1, wherein the transferring step comprises:
   transferring the I/O write request to first and second SSDs, wherein each SSD includes a read cache and a mirror cache, wherein a first mirror cache of the first SSD mirrors unexecuted I/O write requests in a second read cache of the second SSD and a second mirror cache of the second SSD mirrors unexecuted I/O write requests in a first read cache of the first SSD.

8. The method of claim 7, wherein the transferring step comprises transferring the I/O write request to a read cache in a first of the SSDs and transferring the I/O write request to a mirror cache in a second of the SSDs.

9. The method of claim 7, wherein the transferring step comprises transferring the I/O write request to a read cache and mirror cache of a first of the SSDs and transferring the I/O write request to a read cache and mirror cache of a second of the SSDs.

* * * * *